(12) United States Patent
Corvus

(10) Patent No.: US 11,204,966 B2
(45) Date of Patent: Dec. 21, 2021

(54) CONTEXTUAL IMAGE-ASSISTED SEARCH

(71) Applicant: EMC IP Holding Company LLC, Hopkinton, MA (US)

(72) Inventor: Robert Corvus, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 49 days.

(21) Appl. No.: 16/264,911

(22) Filed: Feb. 1, 2019

(65) Prior Publication Data
US 2020/0250237 A1   Aug. 6, 2020

(51) Int. Cl.
*G06F 16/903* (2019.01)
*G06F 16/906* (2019.01)
*G06K 9/66* (2006.01)
*G06N 3/08* (2006.01)

(52) U.S. Cl.
CPC ...... *G06F 16/90335* (2019.01); *G06F 16/906* (2019.01); *G06K 9/66* (2013.01); *G06N 3/08* (2013.01)

(58) Field of Classification Search
CPC ............ G06F 16/90335; G06F 16/906; G06F 16/3329; G06F 16/532; G06F 16/5866; G06K 9/66; G06K 9/00671; G06K 9/726; G06N 3/08; G06N 5/022
See application file for complete search history.

(56) References Cited

U.S. PATENT DOCUMENTS

2018/0108066 A1* 4/2018 Kale ................. G06F 16/24522
2019/0354609 A1* 11/2019 Huang ................... G06F 16/51

* cited by examiner

*Primary Examiner* — Irete F Ehichioya
*Assistant Examiner* — Xiaoqin Hu
(74) *Attorney, Agent, or Firm* — Krishnendu Gupta; Deepika Bhayana; Dorothy Wu Chiang

(57) ABSTRACT

Methods, information handling systems and computer readable media are disclosed for a contextual image-based search. In one embodiment, a method includes receiving, at a computer implemented system for searching a knowledge base, an image submitted by a user of the system. The method continues with obtaining a classification label corresponding to the image, checking a context module database for the presence of a follow-up question associated with the classification label, and generating search term information for searching of the knowledge base, where the search term information comprises the classification label. If a follow-up question associated with the classification label is found, an embodiment further includes presenting the follow-up question to the user of the system, receiving from the user an answer to the follow-up question, modifying the search term information to include the answer, and checking the context module database for an additional follow-up question associated with the answer.

17 Claims, 7 Drawing Sheets

| Product table 500 | | |
|---|---|---|
| Product Name | Product Type | Tech Specs |
| Dell Mouse | Accessory | USB cable |
| Thunderbolt to HTMI Adapter | Accessory | Thunderbolt, HDMI |
| Thunderbolt Dual Hard Drive Enclosure | Accessory | Thunderbolt port, 2 internal SATA hard drive bays |
| Dell Y7N41 Memory Module | Accessory | 8 GB 2666 MHz DDR4 RAM memory |
| Dell Thunderbolt Dock | Accessory | Thunderbolt Port, USB port |
| Dell 27" Monitor | Accessory | Thunderbolt Port, USB port |
| Dell Precision 5530 | System, Laptop | Thunderbolt Port, USB port, 2 slots DDR4 2666 MHz RAM memory |
| Dell XPS 15 | System, Laptop | Thunderbolt Port, USB port, 2 slots DDR4 2666 MHz RAM memory |

*Fig. 5*

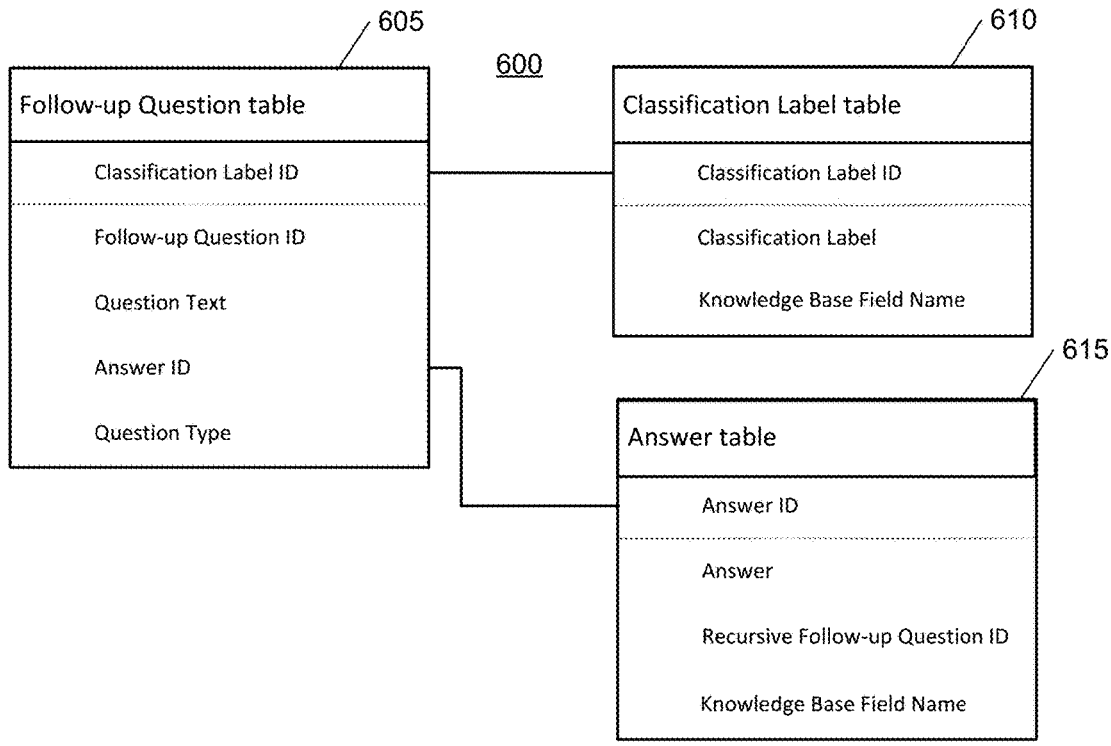

*Fig. 6A*

| Follow-up Question table | 620 | | | |
|---|---|---|---|---|
| Classification Label ID | Follow-up Question ID | Answer ID | Question Type | Question Text |
| 1234 | abc | 1 | radio | Do you want systems HAVING that port? |
| 1234 | def | 2 | radio | Do want devices USING that port? |
| 1234 | ghi | 3,4,5 | checkbox | Would you like to look at: |
| 1234 | jkl | 6,7,8 | checkbox | Do you want any of these additional ports: |

*Fig. 6B*

| Classification Label table | 640 | |
|---|---|---|
| Classification Label ID | Classification Label | Knowledge Base Field Name |
| 1234 | Thunderbolt Port | Tech Specs |
| 4567 | USB port | Tech Specs |
| 8910 | mouse | Product Name |
| 1112 | keyboard | Product Name |

*Fig. 6C*

| Answer table | 660 | | |
|---|---|---|---|
| Answer ID | Answer | Recursive Follow-up Question ID | Knowledge Base Field Name |
| 1 | Systems | ghi | Product Type |
| 2 | Accessories | - | Product Type |
| 3 | Laptops | jkl | Product Type |
| 4 | Tablets | jkl | Product Type |
| 5 | Desktops | jkl | Product Type |
| 6 | Ethernet port | - | Tech Specs |
| 7 | HDMI port | - | Tech Specs |
| 8 | VGA port | - | Tech Specs |

*Fig. 6D*

CONTEXTUAL IMAGE-ASSISTED SEARCH

BACKGROUND

The present disclosure relates generally to networked information handling systems, and more particularly to systems for and methods of contextual image-assisted search of a knowledge base.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Use of an information handling system to access information may involve searching of an information store, or knowledge base. In some cases a user has limited familiarity with the subject matter of a knowledge base or the way the knowledge base is organized. This lack of familiarity can make it difficult to formulate an appropriate search query for obtaining the desired information.

SUMMARY

Methods, information handling systems and computer readable media are disclosed for a contextual image-based search. In one embodiment, a method includes receiving, at a computer implemented system for searching a knowledge base, an image submitted by a user of the system. The method continues with obtaining a classification label corresponding to the image, checking a context module database for the presence of a follow-up question associated with the classification label, and generating search term information for searching of the knowledge base, where the search term information comprises the classification label. If a follow-up question associated with the classification label is found, an embodiment further includes presenting the follow-up question to the user of the system, receiving from the user an answer to the follow-up question, modifying the search term information to include the answer, and checking the context module database for an additional follow-up question associated with the answer.

BRIEF DESCRIPTION OF THE DRAWINGS

The present disclosure may be better understood, and its numerous objects, features and advantages made apparent to those skilled in the art by referencing the accompanying drawings.

FIG. 5 is an example of a table associated with a knowledge base that may be searched using a method as described herein.

FIG. 6A is a database schema diagram for an embodiment of a context module database as described herein.

FIGS. 6B through 6D show embodiments of tables associated with the context module database of FIG. 6A.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

Figure 1A:
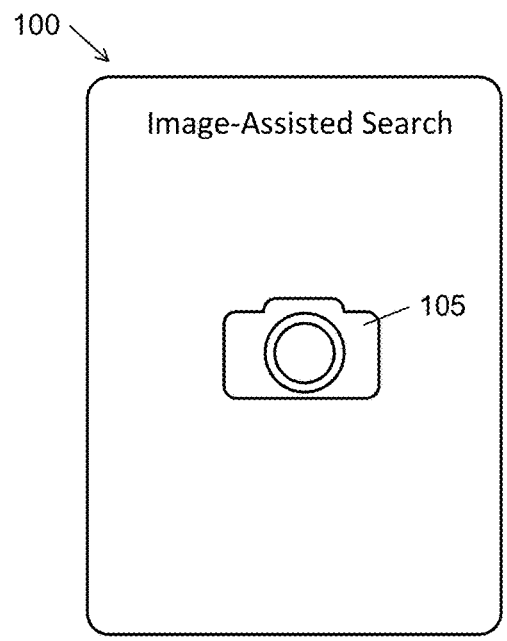
FIGS. 1A through 1D depict screenshots of user interfaces at successive stages of performance of a method as described herein.

An embodiment of a method of performing an image-assisted search is illustrated by the screenshots shown in FIGS. 1A-1D. Screenshot 100 of FIG. 1A depicts a graphical user interface presented on a display screen of an information handling system of a user of an image-assisted search system. The information handling system may take any of the forms described above, including a personal computer or a mobile device. In the embodiment of FIG. 1A, an icon 105 in the shape of a camera is presented for selection by the user if an image-assisted search is desired. Icon 105 is merely an example, and other user interface elements may be used to initiate an image-assisted search in alternative embodiments. A graphical user interface implementing an image-assisted search may include other information and user interface elements not shown in screenshot 100.

Figure 1B:
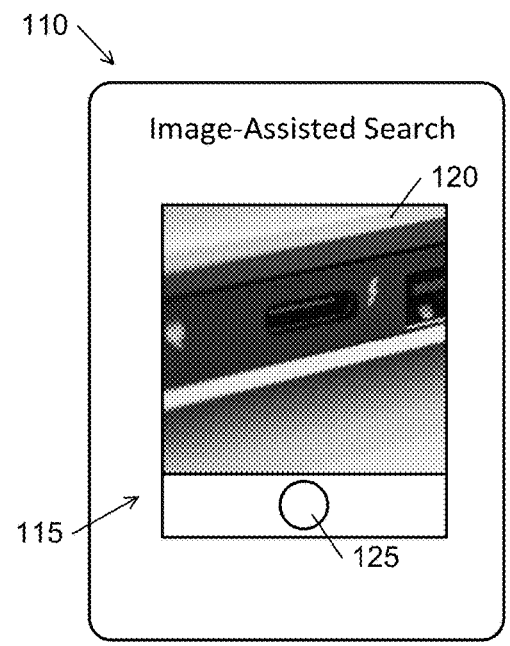

Screenshot 110 of FIG. 1B depicts a graphical user interface displayed at a time after a user has selected icon 105 of interface 100 to begin an image-assisted search process. In the embodiment of FIG. 1B, a camera application window 115 has appeared, including a camera image window 120 and an image acquisition button 125. In an embodiment, the user interface of screenshot 110 is displayed on a mobile device including a camera (such as a smartphone), and the image appearing in camera image window 120 is an image received by the camera of the mobile device. In an alternative embodiment, a user interface displayed on a device without a camera may include, for example, a file browser application window for selecting a stored image for upload instead of camera application window 115.

Figure 1C:
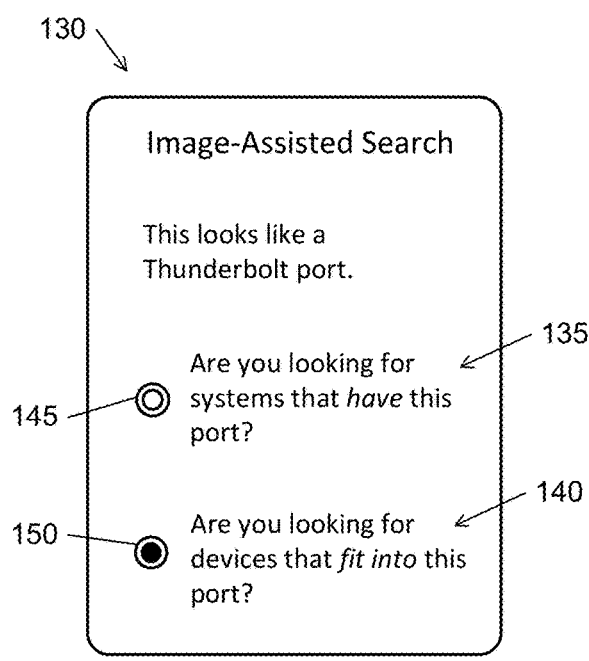

Continuing with the example of FIGS. 1A-1D, the image shown in image window 120 is submitted to a system as described herein for performing an image-assisted search. Screenshot 130 of FIG. 1C shows a pair of follow-up questions presented to the user by the system. At the time of screenshot 130, the image-assisted search system has determined that the image submitted by the user depicts a Thunderbolt™ 3 USB Type-C port. The user interface depicted by screenshot 130 of FIG. 1C includes questions 135 and 140 with respective radio buttons 145 and 150 for user response to the questions. In the embodiment of FIG. 1C, selection of the radio button next to a question represents a "yes" answer to that question, and only one of the two radio buttons can be selected at a given time. In this example, the user has selected radio button 150 to indicate an interest in devices that fit into the Thunderbolt™ port, as opposed to systems including that port.

Figure 1D:
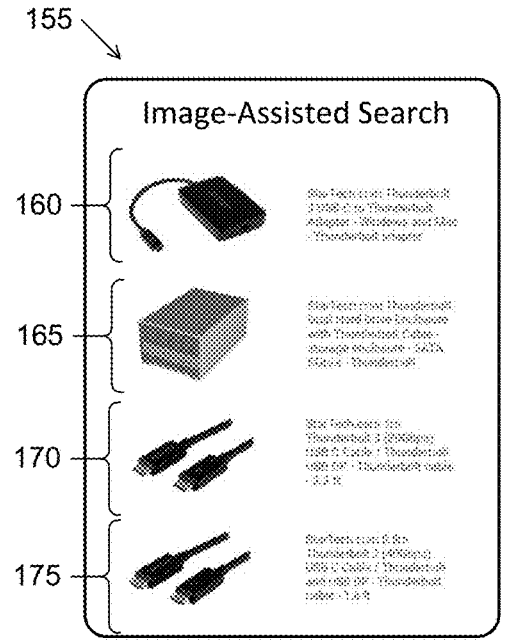

Screenshot 155 of FIG. 1D depicts a graphical user interface provided in response to the user's answer to the questions shown in screenshot 130 of FIG. 1C. In the embodiment of FIG. 1D, the image-assisted search system has generated a search query and performed a search of a knowledge base using the query. Results of that search, including result items 160, 165, 170 and 175, are displayed in the graphical user interface. In this embodiment, each result item includes an image and accompanying descriptive language. Either or both of the image and descriptive language may be configured as a hyperlink allowing access to additional information, in a manner that will be understood by those skilled in the art of computer-implemented search systems in view of this disclosure. In the example of FIGS. 1A-1D, the knowledge base searched by the image-assisted search system is a database of available products. The knowledge base is not limited to this example, however, and could in other embodiments include technical support information, medical information, or any other information in a searchable data store.

An image-assisted search such as that illustrated in FIGS. 1A-1D may advantageously allow a user who does not know the name of a device or feature to nonetheless search for information regarding that device or feature. The methods and systems disclosed herein may also allow a user to determine a specific configuration or variety of a feature the user has only a general familiarity with. As another example in the area of computer components, a user may know that more memory for a particular computer system is needed, but not know the particular module that is compatible with the computer system. In an embodiment of an image-assisted search method, the user can submit a photograph of the memory module slots on the computer's motherboard. From this image the search system can determine the type of memory, such as double data rate fourth-generation dynamic random-access memory (DDR4 DRAM). The search system can then present a request to the user for identification of the microprocessor used by the computer. In an embodiment, the user submits a photograph of the computer's processor, from which the search system can identify the processor. The search system can then formulate a search query of its knowledge base for available compatible memory modules, perform the search, and present the results to the user. Further explanation and details are provided by the following embodiments.

Figure 2:
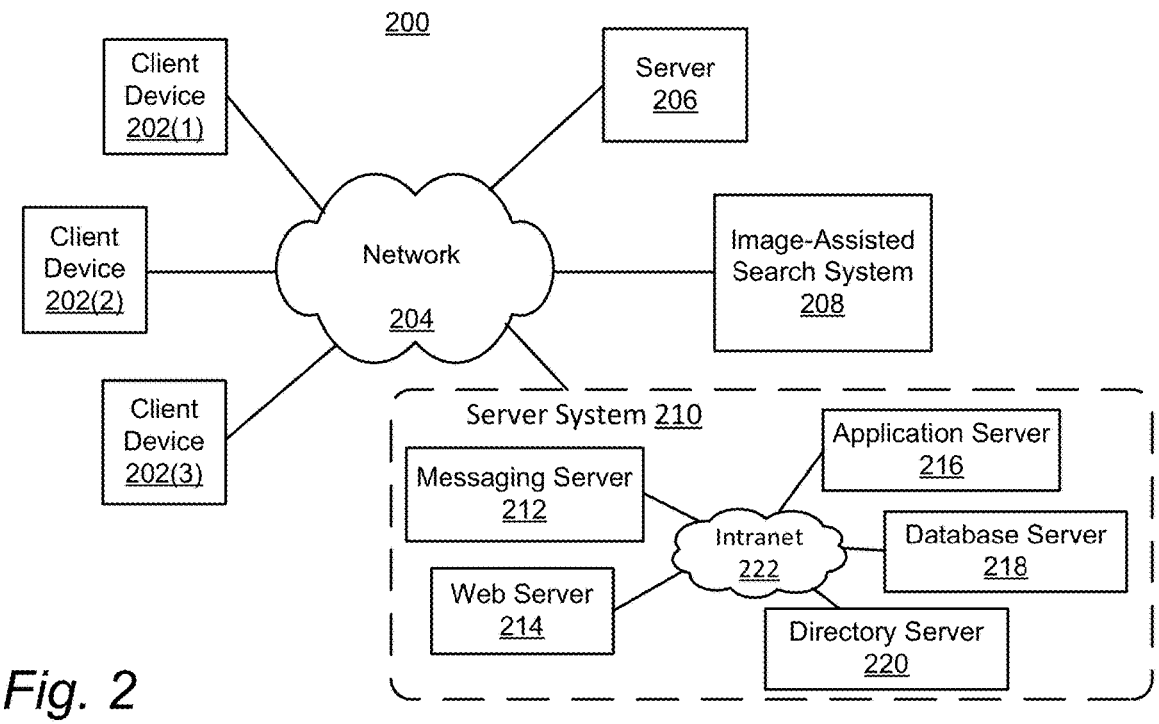
FIG. 2 is a block diagram illustrating an embodiment of a network environment including multiple information handling systems.

A network environment 200 including multiple networked information handling systems is shown in FIG. 2. In the embodiment of FIG. 2, client computing devices 202 (1)-(3), server computing device 206, image-assisted search system 208, server device 206 and server system 210 are communicatively coupled to one another via network 204. Client computing devices 202(1)-(3), server 206 and image-assisted search system 208 are embodiments of information handling systems as described above and elsewhere herein, and may take any of the various forms described, including personal computers, tablet computers, smartphones, or servers, as appropriate. As noted above, an information handling system may include an aggregate of instrumentalities. For example, as used in this disclosure, "server" may include a server system such as server system 210, where a server system includes multiple networked servers configured for specific functions. As an example, server system 210 includes a messaging server 212, web server 214, application server 216, database server 218 and directory server 220, interconnected with one another via an intranet 222. Network 204 includes one or more networks suitable for data transmission, which may include local area networks (LANs), wide area networks (WANs), storage area networks (SANs), the Internet, or combinations of these. In an embodiment, network 106 includes a publicly accessible network, such as a public switched telephone network (PSTN), a DSL connection, a cable modem connection or large bandwidth trunks (e.g., communications channels providing T1 or OC3 service). Such networks may also include cellular or mobile telephone networks and other wireless networks such as those compliant with the IEEE 802.11 standards. Intranet 222 is similar to network 204 except for being, typically, private to the enterprise operating server system 210.

Figure 3:
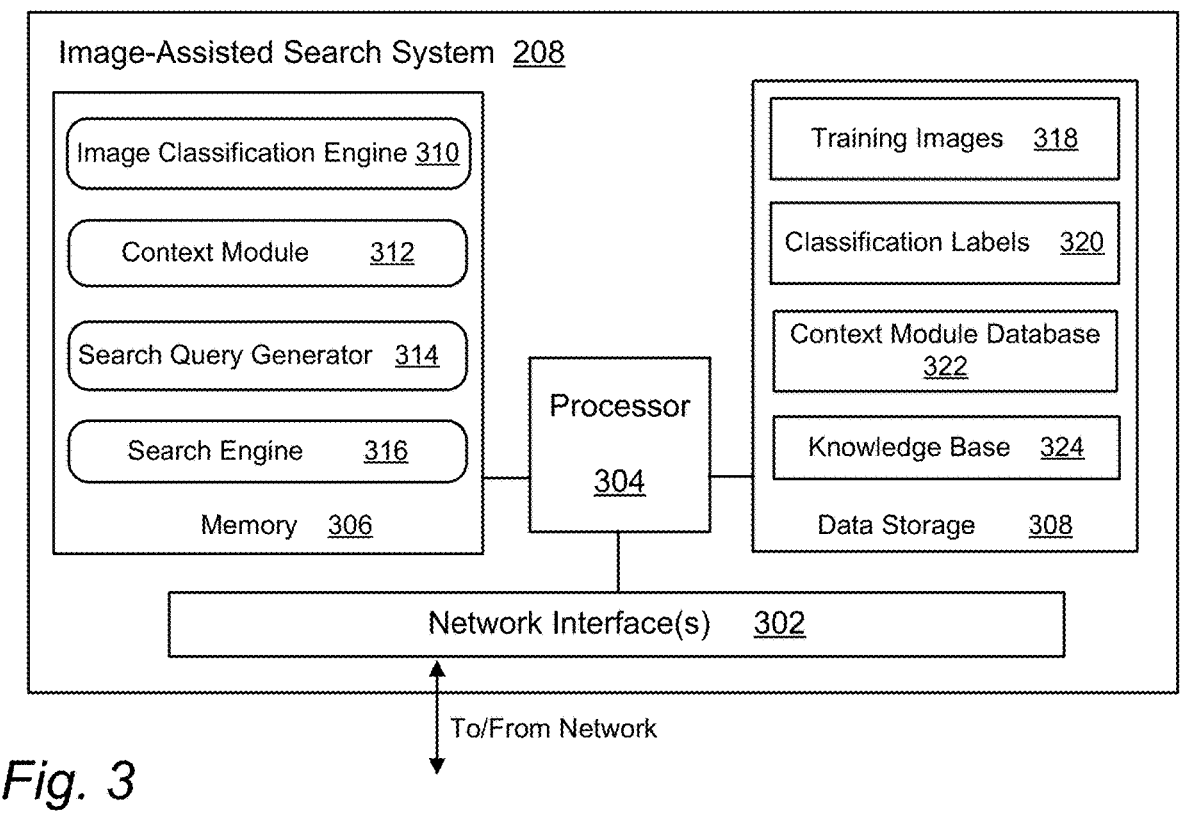
FIG. 3 is a block diagram illustrating certain components of an embodiment of an information handling system configured as an image-assisted search system.

A block diagram illustrating certain components of an embodiment of image-assisted search system 208 is shown in FIG. 3. Although illustrated as a single device in FIG. 3, the image-assisted search system disclosed herein may also be implemented as a server system similar to server system 210 of FIG. 2. In the embodiment of FIG. 3, image-assisted search system 208 includes one or more network interfaces 302, a processor 304, memory 306 and data storage 308. Memory 306 stores program instructions that when executed by processor 304 implement an image classification engine 310, a context module 312, a search query generator 314 and a search engine 316. Data storage 308 is configured to store data including training images 318, classification labels 320, a context module database 322 and a knowledge base 324.

Network interface 302 is configured for both sending and receiving of data and control information within a network. In an embodiment, network interface 302 comprises multiple interfaces and can accommodate multiple communications protocols and control protocols. Memory 306 includes a plurality of memory locations addressable by processor 304 for storing program instructions and data used in program execution. As such, memory 306 may be implemented using any combination of volatile or non-volatile memory, including random-access memory (RAM) and read-only memory (ROM). In an embodiment, memory 306 is system memory for processor 304. Data storage 308 includes one or more integrated or peripheral mass storage devices, such as magnetic disks, optical disks, solid state drives or flash drives. In other embodiments, or at other times during operation of the embodiment of FIG. 3, some or all of the instructions shown in memory 306 may be stored in data storage 308, and some or all of the data shown in data storage 308 may be stored in memory 306.

Image classification engine 310 is configured to classify a received image using a set of classification labels 320, where the classification labels are relevant to the content of the knowledge base to be searched using image-assisted search system 208. Image classification engine 310 implements a machine learning model, such as a convolutional neural network, that is trained using a set of training images 318, where the training images are images similar to those expected to be submitted by users of image-assisted search system 208. In a manner that will be understood by those of ordinary skill in the art of image classification in view of this disclosure, training of the machine learning model using training images 318 and classification labels 320 allows image classification engine 310 to classify subsequently-received images by assigning one of classification labels 320 to each received image. It is noted that while training images 318 are used during the training process for image classification engine 310, training images 318 need not be retained after training when system 208 is used for classification of user-submitted images.

Context module 312 is configured to receive a classification label corresponding to an image submitted by a user, check context module database 322 to determine whether a follow-up question for the user is associated with the classification label, and generate search term information for searching of knowledge base 324, where the search term information includes the received classification label. If there is a follow-up question associated with the classification label, the follow-up question is presented to the user, and an answer is received from the user. If there is then a follow-up question associated with the answer in the context module database, this question is also presented to the user, continuing until no additional follow-up questions are found. Search term information generated by context module 312 includes any answers received in addition to the classification label. In an embodiment, the search term information further includes field names from knowledge base 324 corresponding to the classification label and answers.

Search query generator 314 is configured to receive search term information generated by context module 312 and formulate a search query for searching knowledge base 324. The search query includes the classification label and any answers included in the search term information, and is in the format of a query language compatible with knowledge base 324. Search engine 316 applies the search query to knowledge base 324 and generates a list of search results for presentation to the user. In an embodiment, search engine 316 filters or ranks the search results for expected relevance, based on criteria such as popularity or user search history.

Knowledge base 324 is a data store searched by image-assisted search system 208. In an embodiment, image classification engine 310 is trained to classify received images using classification labels relevant to the contents of knowledge base 324, and context module database 322 includes follow-up questions designed to improve the relevance of search results obtained from knowledge base 324. Knowledge base 324 may include any searchable information store, such as a database of product sales and/or support information, a store of academic research in a particular area, or the entire Internet.

Further alternatives and variations will be apparent to one of ordinary skill in the art in view of this disclosure. For example, some or all of the modules depicted within memory 306 may be implemented using separate servers as part of a server system like system 210 of FIG. 2. Data depicted within data storage 308 may also be associated with one or more separate servers. Software modules and engines described herein may take various forms understood to one of ordinary skill in the art in view of this disclosure. A single module or engine described herein may in some embodiments be implemented by a combination of multiple files or programs. Alternatively or in addition, one or more functions associated with modules or engines delineated separately herein may be combined into a single file or program. As an example, search query generator 314 may in some embodiments be integrated with context module 312 or search engine 316.

Figure 4:
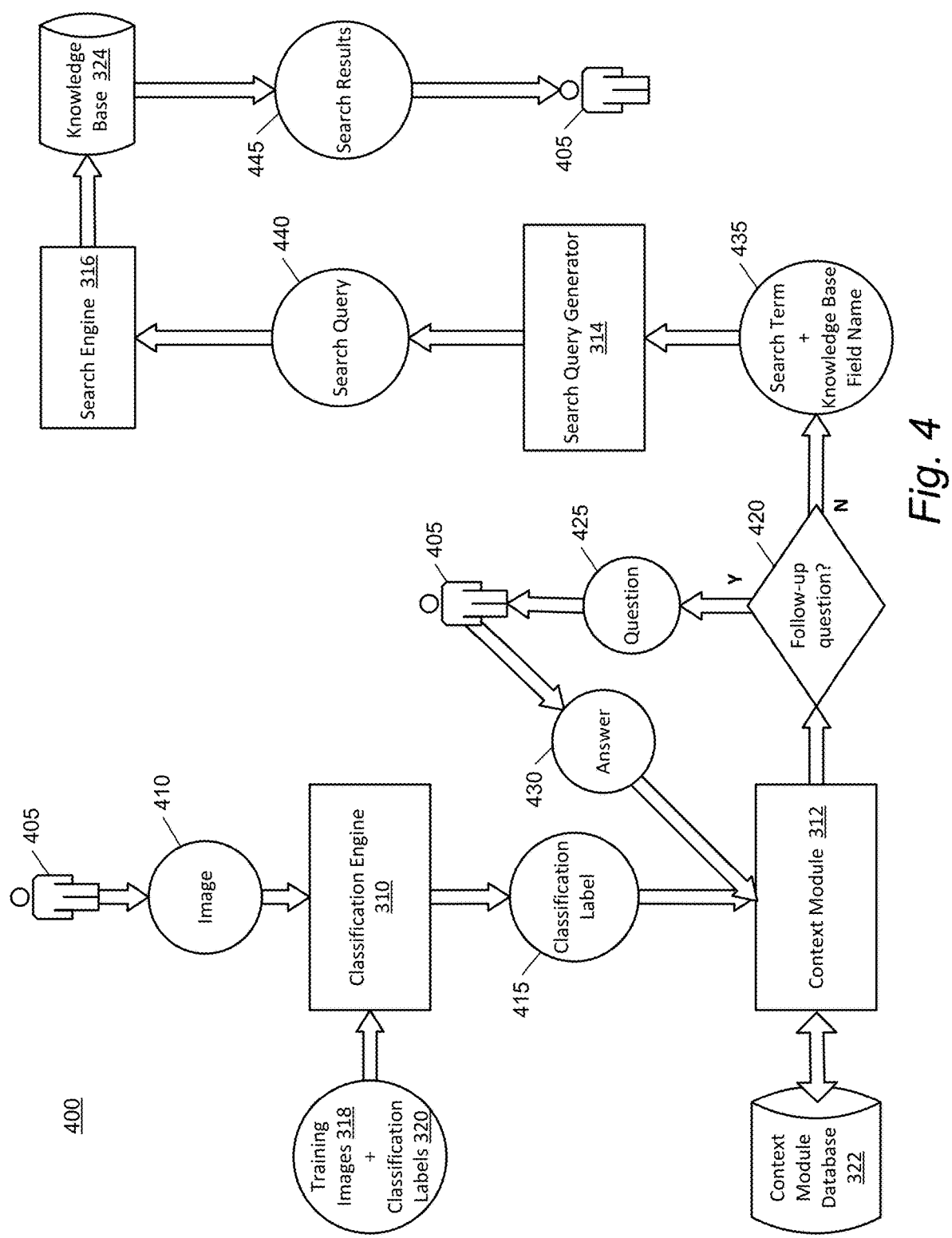
FIG. 4 is a process flow diagram illustrating an embodiment of a method as described herein.

A process flow diagram illustrating the overall image-assisted search process is shown in FIG. 4. This type of diagram may also be referred to as an architecture diagram. In general, rectangular elements in the diagram of FIG. 4 refer to software engines or modules such as those depicted within memory 306 of FIG. 3. Circular elements refer to inputs to or outputs from those modules or engines, and cylindrical elements represent data stores. Process flow 400 of FIG. 4 begins with a user 405 submitting a digital image 410 to the image-assisted search system. The image may be submitted by uploading via a web site, as an attachment to an email or text message, in an online chat session, through a smartphone application, through an augmented reality system such as one employing "smart glasses," by insertion of a memory device into a kiosk system, or by any other method of transferring a digital image between a user and the image-assisted search system.

In some embodiments, the user's submission of image 410 includes a process of isolating a relevant region of the image. In the case of the image shown in camera image window 120 of FIG. 1B, for example, time and computational resources can be saved if the part of the image addressed by the image classification engine is limited to the area around the computer port near the center of the image (or other region of interest, in the general case). Isolation of a relevant portion of the image may also be advantageous when an image contains multiple features that may correspond to classification labels. In an embodiment, a process of isolating a relevant region includes displaying the image to the user with an overlay delineating a proposed region (such as a bounding box) and receiving an indication from the user of whether the proposed region is the relevant region for the image-assisted search. In an embodiment for which a real-time image capture is used for the search (such as an application on a smartphone or augmented reality glasses), the overlay may be applied to the image in a camera image window such as window 120 of FIG. 1B. Alternatively, a submitted image can be sent back to the user's device with an overlay applied. In a further embodiment, the overlay may be movable and/or size-adjustable by the user for delineation of the desired region, with the image and overlay then submitted to the image-assisted search system. In an embodiment, an initial proposed relevant region is determined using a separate algorithm from the algorithm used for image classification, such as an edge-detection algorithm.

When the image 410 is received by classification engine 310 (and any relevant-region isolation completed), the image is processed using the classification engine's trained image classification model to determine the best classification label 415 for the image. Training images 318 and classification labels 320 are shown as inputs to classification engine 310, but it is noted that these inputs are provided during training of the image classification model, which happens before submission of image 410. Training images 318 are images similar to those expected to be submitted by users searching knowledge base 324. In an embodiment for which knowledge base 324 is a product database for a computer retailer, for example, training images 318 may include images of computers, computer ports, computer accessories, and portions of these things, where the images are taken from various directions and in various orientations.

In a further embodiment of process 400 not explicitly shown in FIG. 4, classification label 415 is presented to the user for verification once it has been determined by classification engine 415. As an example, this verification step could take the form of a statement such as the "This looks like a Thunderbolt port" statement shown in screenshot 130 of FIG. 1C, with an additional user response option along the lines of "Incorrect image identification." In a further embodiment, classification engine 310 presents another possible classification label to the user in the event the user has indicated the original classification label is incorrect.

Context module 312 receives classification label 415 and searches context module database 322 to determine whether there is a follow-up question associated with classification label 415. If a follow-up question is found, as illustrated by decision step 420 of process 400, question 425 is presented to the user. In an embodiment, the question is displayed on the user's computing device via a graphical user interface, as shown in screenshot 130 of FIG. 1C. Such a user interface may be presented as part of a web page or smartphone application, for example. In alternative embodiments, the follow-up question may be sent in written form by text message or email, or presented in spoken form using speech synthesis. An answer 430 from the user is received by context module 312. Depending on the format of the question, the answer may take any of various forms, including but not limited to entered free text, text selected from a dropdown menu, a code representing a radio button or check box selection, or a transcribed voice response. Context module 312 again checks context module database 322 to determine whether an additional follow-up question is associated with answer 430. If there is an additional follow-up question, the question and answer loop is repeated, until there is no follow-up question found for the last answer received.

When no follow-up question is found by searching the context module database, context module 312 provides search term information 435 to search query generator 314. In the embodiment of FIG. 4, search term information 435 includes one or more search terms and one or more knowledge base field names. The search terms in search term information 435 include the classification label 415 and any answers 430 received by the context module. One or more of classification label 415 and any answers 430 may also be associated with a knowledge base field name in context module database 322. Associating a knowledge base field name with a search term allows a search query to be generated that instructs the search engine to search for a particular term within a specific field of a database representing the knowledge base. This localization of the search can improve the relevance of the search results. In an alternative embodiment, search term information 435 does not include knowledge base field names. Such an embodiment can be used if the knowledge base is not organized in a way that uses fields, or if searching across all fields of the knowledge base is acceptable. An example of how knowledge base fields may be associated with classification labels or answers in context module database 322 is discussed below in connection with FIGS. 6A-6D.

Search query generator 314 converts search term information 435 into a search query 440 compatible with search engine 316 and knowledge base 324. For example, if knowledge base 324 is a database designed to use structured query language (SQL), search query 440 may be in the form of one or more SQL queries. Search engine 316 applies search query 440 to knowledge base 324 and obtains a list of search results 445 which are presented to the user.

A simplified example of a table within a knowledge base to be searched is shown in FIG. 5. Product table 500 of FIG. 5 is a table of product information that might be maintained by a computer retailer. Table 500 has been made unrealistically small for purposes of explanation, and is not intended to completely (or necessarily accurately) describe any particular products mentioned therein. In an embodiment, entries in table 500 are linked (for example, via a Universal Research Locator (URL) for the World Wide Web) to more extensive information, such as data sheets, for the products described by the entries. The information in table 500 is organized using fields 510, 520 and 530, which have respective field names of "Product Name," "Product Type" and "Tech Specs."

Even from the simplified example of product table 500, it can be seen that a product database for a technological product can reflect an extensive array of detailed options. Taking the example of computer interfaces, three different port types (Thunderbolt, HDMI, USB) can be seen in Table 500 alone, and a complete computer product table would include several others as well. A non-enthusiast computer user could easily be unaware of the names of all of the ports, and might therefore not have a place to begin searching a product database for an accessory compatible with a particular port observed on their own computer. The image-assisted search disclosed herein can allow a user to initiate a search by submitting a photograph of such a port. Even when the name of a feature is known, that name may appear in multiple different contexts in a knowledge base. For example, "Thunderbolt" appears in six of the entries in table 500. Some of those entries are for accessories that plug into a Thunderbolt™ port, while others are for systems that have a Thunderbolt™ port. A simple search of table 500 for "Thunderbolt" will therefore return a long list of results, many of which may not be relevant to the user. The context module of the search disclosed herein can provide search queries that improve the relevance of search results by narrowing the scope of a search.

A database schema diagram illustrating the structure of one embodiment of context module database 322 is shown in FIG. 6. Schema diagram 600 includes table block 605 representing a follow-up question table, table block 610 representing a classification label table and table block 615 representing an answer table. The follow-up question table referenced in block 605 includes five fields: Classification Label ID, Follow-up Question ID, Question Text, Answer ID and Question Type. The classification label table referenced in block 610 includes three fields: Classification Label ID, Classification Label and Knowledge Base Field Name. The answer table referenced in block 615 includes four fields: Answer ID, Answer, Recursive Follow-up Question ID, and Knowledge Base Field Name. The follow-up question table is connected to the classification label table via the Classification Label ID field common to both tables. The follow-up question table is connected to the answer table via the Answer ID field common to both tables. The Classification Label ID field is a primary key to the classification label table, and the Answer ID field is a primary key to the answer table.

Illustrative portions of the tables referenced in the diagram of FIG. 6A are shown in FIGS. 6B-6D. Portion 620 of a follow-up question table is shown in FIG. 6B, portion 640 of a classification label table is shown in FIG. 6C, and portion 660 of an answer table is shown in FIG. 6D. For clarity of explanation, table portion 620 of FIG. 6B is limited to entries associated with a single classification label ID of "1234". A full follow-up question table would include entries for any classification labels that follow-up questions have been generated for. The relationship between classification label IDs, such as ID 1234 of table 620, and plain-text classification labels is stored in the classification label table of FIG. 6C. As shown in table portion 640 of FIG. 6C, classification label ID 1234 corresponds to the classification label "Thunderbolt port." In the embodiment of FIGS. 6A-6D, a numeric classification label identifier (ID) is associated with each plain-text classification label. The classification label ID can be used to represent the classification label for purposes internal to the image-assisted search system, and converted to the classification label for situations in which plain text is needed, such as presentation to a user or text-based searching. For purposes of this disclosure, "classification label" can refer to either a plain-text label or to an identifier representing that label. Therefore, for example, transmission of classification label 415 from classification engine 310 to context module 312 as shown in FIG. 4 may be implemented by transmission of a classification label ID associated with classification label 415.

Returning to FIG. 6B, the four entries in follow-up question table portion 620 reflect four follow-up questions associated with the Thunderbolt port classification label ID. Each of the follow-up questions is assigned a follow-up question ID, an answer ID, a question type, and a string of question text. The follow-up question ID uniquely identifies a combination of a classification label ID and follow-up question, and can be used in the answer table of FIG. 6D to identify "recursive follow-up questions," or additional follow-up questions associated with answers to previous follow-up questions. An answer ID in the third column of table portion 620 is a numeric identifier representing an answer to the question associated with the follow-up question ID. The relationship between answer IDs and plain-text answers is stored in the answer table of FIG. 6D. For purposes of this disclosure, "answer" can refer to either a plain-text answer or to an identifier representing that answer. Therefore, for example, submission of answer 430 to context module 312 as shown in FIG. 4 may be implemented by transmission from the user's device to the context module of an answer ID associated with the answer.

The question type field of table portion 620 in FIG. 6B identifies the format of the question associated with the follow-up question ID. In addition to the radio button and check box question types shown in table portion 620, other question types may be used as appropriate, including drop-down menus, requests for free text response, and requests for submission of an additional image. Questions and answers may be submitted via a graphical user interface or in other ways such as by voice synthesis and voice response, by text message or online chat, or by email. In an embodiment, the question type in table portion 620 may be represented by a code rather than a plain-text name. The question text field of table portion 620 includes the text content of the question, which may be combined with answers from answer table portion 660 when presenting possible answers for selection by the user.

Moving to FIG. 6C, classification label table portion 640 relates classification label IDs to plain-text classification labels, as noted above. Table portion 640 also relates a knowledge base field name to each classification label ID. In an embodiment, the knowledge base field name associated with a classification label is the name of a field in the knowledge base that should be searched using the classification label as a search term. For example, the knowledge base field name column of table portion 640 indicates that searches for "Thunderbolt port" or "USB port" should be carried out in the Tech Specs field of product table 500 in FIG. 5 (the knowledge base used for this example). By contrast, searches for "mouse" or "keyboard" should be carried out in the Product Name field of product table 500. In some embodiments, multiple knowledge base field names can be included in a knowledge base field name field within the context module database.

Answer table portion 660 in FIG. 6D relates answer IDs to plain-text answers, as noted above in the discussion of FIG. 6B. In the Recursive Follow-up Question ID field, follow-up question IDs are associated with some of the answers to previously-asked questions. For example, the first entry of table portion 660 indicates that if answer ID "1" is received as a response to follow-up question "abc" in table portion 620, additional follow-up question "ghi" is then presented to the user. Table portion 660 also relates a knowledge base field name to each answer ID. In an embodiment, the knowledge base field name associated with an answer is the name of a field in the knowledge base that should be searched using the answer as a search term. For example, the knowledge base field name column of table portion 660 indicates that searches for "Systems," "Accessories," "Laptops," "Tablets" or "Desktops" should be carried out in the Product Type field of product table 500 in FIG. 5. By contrast, searches for "Ethernet port," "HDMI port" or "VGA port" should be carried out in the Tech Specs field of product table 500.

Use of the context module database embodiment of FIGS. 6A-6D can be illustrated by an example in which the classification label "Thunderbolt port" (or corresponding classification label ID "1234") is received by context module 312. Turning to follow-up question table portion 620, there are four follow-up question IDs associated with the received classification label ID. A method of selecting the appropriate questions to present to the user is described by the following pseudocode for a first call to the context module database:

Select all from Follow-up Question table
where Classification Label ID equals myClassificationLabelID
and Follow-up Question ID does not equal Answer table's Recursive Follow-up Question ID
join Answer table on Answer ID In the pseudocode above, the classification label ID received from classification engine 310 is assigned to the variable "myClassificationLabelID." The method implemented by the pseudocode selects all follow-up questions in the follow-up question table 620 having a classification label ID matching the received classification label ID, but removes those questions having a follow-up question ID matching a recursive follow-up question ID in answer table 660. The "does not equal" line of the pseudocode removes follow-up question IDs "ghi" and "jkl" from the selected questions, since those follow-up question IDs appear in the Recursive Follow-up Question ID field of answer table 660. The selected questions are therefore the questions identified by follow-up question IDs "abc" and "def". Because the question type for these questions is designated as a radio button in table portion 620, a pair of radio buttons associated with the corresponding text from the Question Text field is presented to the user. The result is a pair of questions similar to those shown in screenshot 130 of FIG. 1C.

When an answer to the presented question is received, answer table portion 660 is checked to determine whether an additional follow-up question is associated with the received answer. For example, if the user chooses answer ID "2" rather than answer ID "1" in response to the presented radio buttons (i.e., selecting devices using the port rather than systems having the port), no follow-up question ID corresponding to an answer ID of 2 is shown in the Recursive Follow-up Question ID field of table 660. There are therefore no additional follow-up questions to present to the user. Context module 312 generates search term information for search query generator 14. In the current example, the search terms within the search term information include the classification label "Thunderbolt port" and the answer "Accessories" (corresponding to answer ID "2"). In an embodiment, the search term information also includes the knowledge base field names associated with the search terms. In such an embodiment, the search term information would indicate that "Thunderbolt port" should be searched in the knowledge base field Tech Specs, and "Accessories" should be searched in the knowledge base field Product Type. Generation of an appropriate search query by search query generator 314 and application of that search query to product table 500 would produce a set of results including the second, third, fifth and sixth entries in table 500. A list of these results would then be presented to the user.

As an "alternative ending" to the above example, consider that the same question is presented to the user, but the user chooses answer ID "1" in response rather than answer ID "2". In this case, a follow-up question ID of "ghi" corresponding to an answer ID of "1" is shown in the Recursive Follow-up Question ID field of answer table 660. If the follow-up question ID "ghi" determined from table 660 is assigned to a variable called myRecursiveFollowupQuestionID, selection of the next follow-up question to present to the user is described by the following pseudocode:

Select all from Follow-up Question table
where Classification Label ID equals myClassificationLabelID
and Follow-up Question ID equals myRecursiveFollowupQuestionID
join Answer table on Answer ID The method implemented by the above pseudocode simply selects the follow-up question ID associated with the received answer in answer table 660. Follow-up question table 620 shows that selected follow-up question ID "ghi" corresponds to a checkbox having as possible answers the answers associated with answer IDs 3, 4 and 5. In the embodiment of FIGS. 6A-6D, context module 312 employs a rule that for checkbox questions such as question "ghi", the question text from table 620 is combined with the plain-text answers from table 660 to produce a question of the form:

Would you like to look at:
Laptops
Tablets
Desktops

An answer to the above follow-up question can include any or all of the three checkbox choices. Question "ghi" is presented to the user. Assuming at least one of the boxes is checked by the user, answer table 660 indicates that another follow-up question, having follow-up question ID "jkl" is associated with the answer. Follow-up question table 620 shows that question "jkl" is a checkbox question about additional ports, with possible answers corresponding to answer IDs 6, 7 and 8. Question "jkl" is presented to the user. Because none of answer IDs 6, 7 or 8 is associated with an additional follow-up question ID in answer table 660, the recursive question process ends at that point. In an embodiment where the user selects "Laptops" in response to question "ghi" and "HDMI port" in response to question "jkl", search terms in the search term information 435 generated by context module 312 for this example include classification label "Thunderbolt port" and answers "Systems," "Laptops," and "HDMI port." In a further embodiment for which knowledge base field names are included in search term information 435, the search term information indicates that "Thunderbolt port" and "HDMI port" should be searched in the Tech Specs field of product table 500, and that "Systems" and "Laptops" should be searched in the Product Type field of product table 500.

The database schema and tables shown in FIGS. 6A-6D represent one implementation of a context module database as described herein. Multiple alternatives and variations will be apparent to one of ordinary skill in the art of database design in view of this disclosure.

Figure 7:
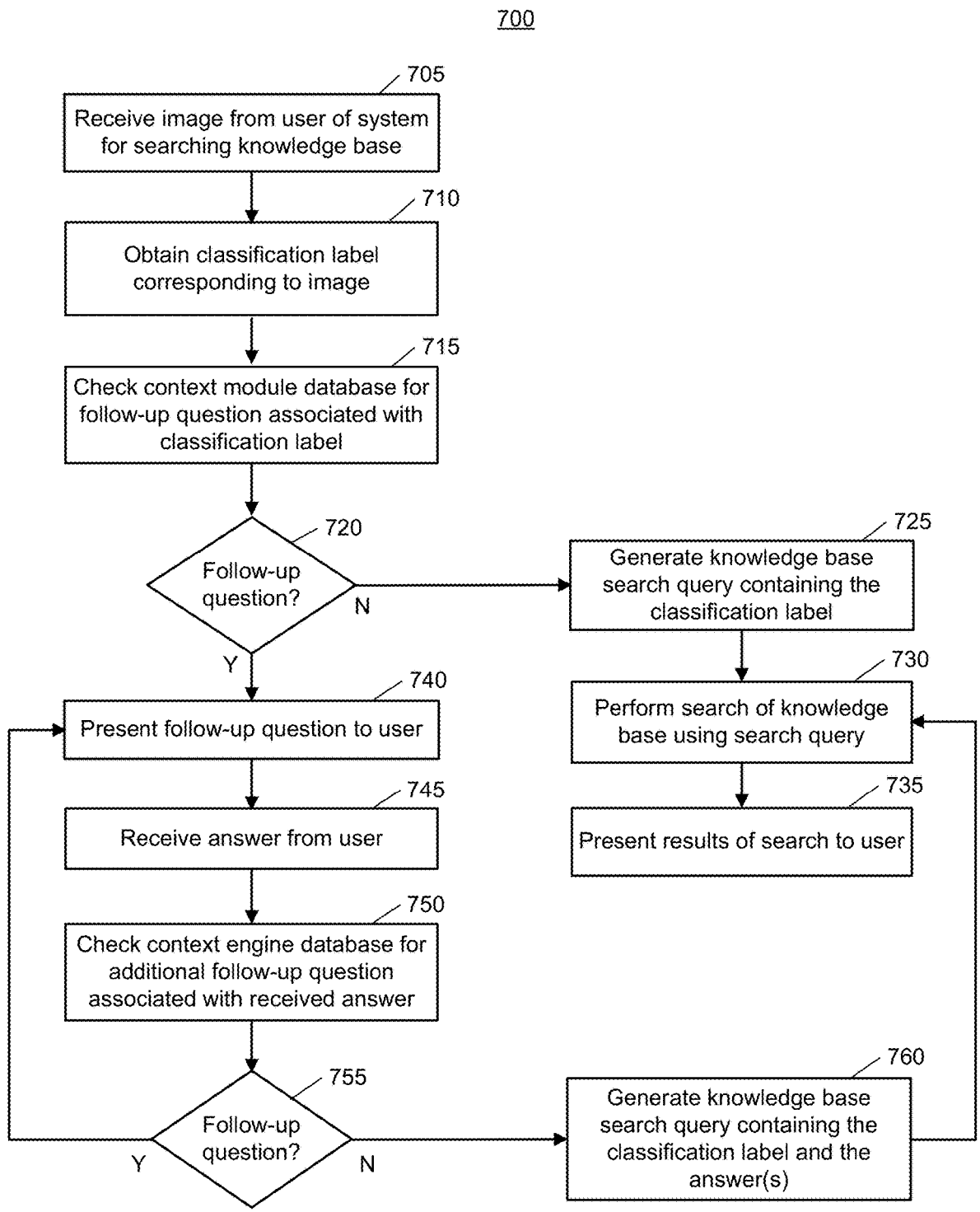
FIG. 7 is a flow chart illustrating an embodiment of a method for image-assisted searching.

A flow chart illustrating an embodiment of a method for performing an image-assisted search is shown in FIG. 7. Method 700 of FIG. 7 is an embodiment of a method performed by an image-assisted search system such as system 208 of FIG. 3. In some embodiments, before method 700 begins, the image-assisted search system is pre-configured for searching of a target knowledge base. The pre-configuration includes training the machine learning model employed by the image classification engine within the search system. In an embodiment, the training uses a set of training images similar to those expected to be submitted by users, and trains the model to classify the training images using a set of classification labels expected to be useful as search terms for searching the knowledge base. Pre-configuration of the image-assisted search system also includes populating a context module database, such as database 322 of FIGS. 3 and 4, with initial follow-up questions associated with some or all of the classification labels to be used by the image classification engine, as appropriate. In an embodiment, populating of the context module database also includes associating additional follow-up questions with some of the answers to be received in response to the initial follow-up questions. In some embodiments, populating of the context module database includes associating field names from the target knowledge base with classification labels and with answers.

Search method 700 begins at step 705 with receiving an image from a user of the system. The image can be received in various ways discussed further above in connection with the process flow of FIG. 4. The method continues in step 710 with obtaining a classification label corresponding to the image. The classification label is determined by a classification engine within the search system, as discussed further above in connection with FIGS. 3 and 4. In step 715 of method 700, a contest module database is checked for one or more follow-up questions associated with the classification label. If no follow-up question is found ("N" branch of decision step 720), the method continues with generating a knowledge base search query containing the classification label (step 725). In an embodiment, the knowledge base search query is generated by a search query generator module of the search system, based on search term information generated by a context module of the system. The generated search query may in some embodiments contain a field name from the knowledge base to be searched in addition to the classification label. This branch of the method continues with performing a search of the knowledge base using the search query, and presenting results of the search to the user.

If a follow-up question associated with the classification label is found ("Y" branch of decision step 720), the question is presented to the user (step 740) and an answer to the question is received (step 745). The question and answer may be transmitted in various ways, as discussed further above in connection with FIG. 4. The method continues with checking the context engine database for an additional follow-up question associated with the received answer. If an additional follow-up question associated with the received answer is found ("Y" branch of decision step 755), the loop including steps 740 through 755 is repeated until no additional follow-up question is found. When no additional follow-up question is found ("N" branch of decision step 755), the method continues with generating a knowledge base search query containing the classification label and any answers received to follow-up questions (step 760). In an embodiment, the search query contains one or more field names from the knowledge base in addition to the classification label and answers. The method continues with performing a search of the knowledge base using the search query, and presenting results of the search to the user.

Figure 8:
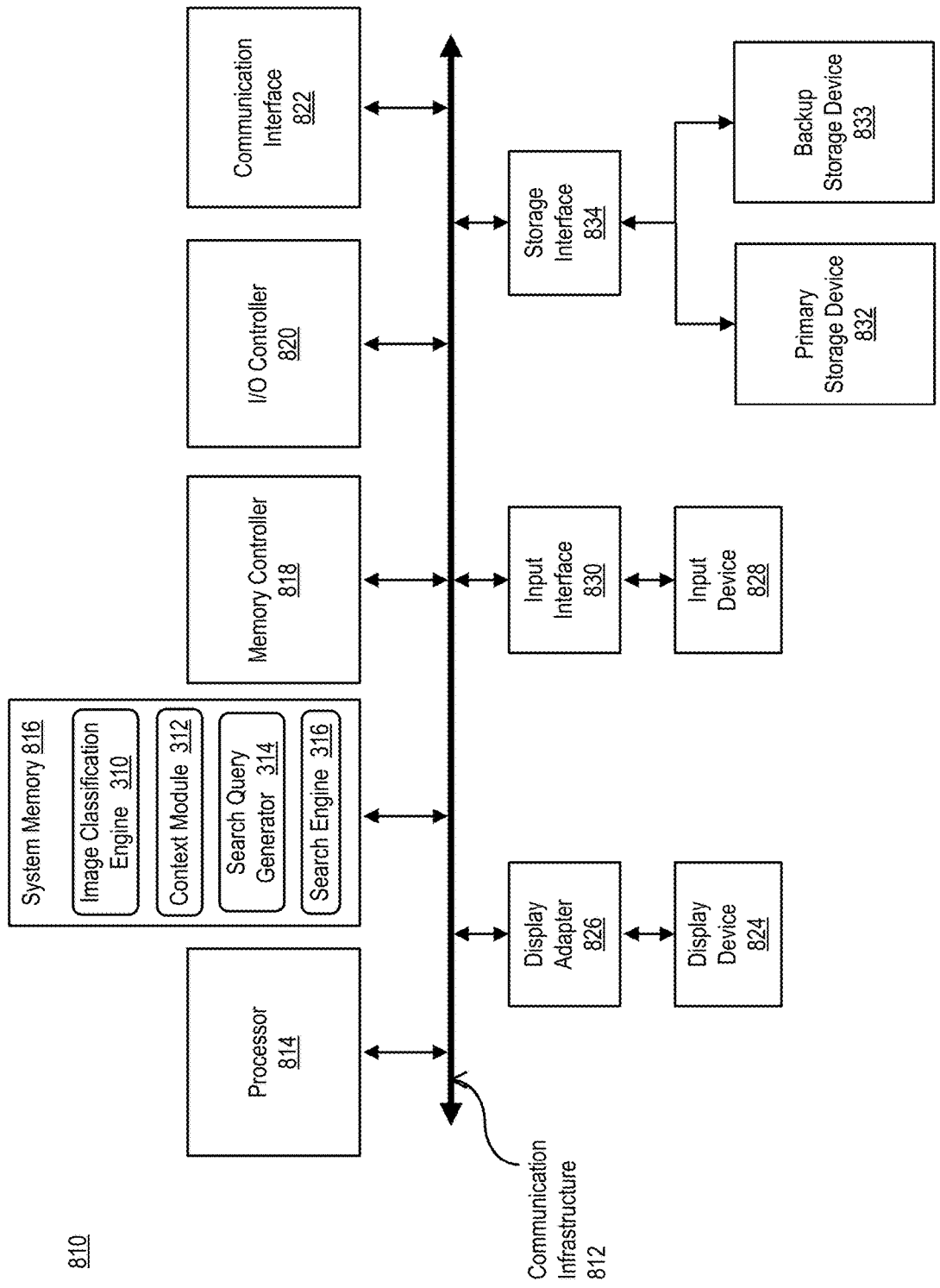
FIG. 8 is a block diagram illustrating an embodiment of an information handling system.

FIG. 8 depicts a block diagram of an information handling system 810 suitable for implementing aspects of the systems described herein. In the embodiment of FIG. 8, computing system 810 implements image-assisted search system 208. Embodiments of the computing system of FIG. 8 can, alternatively or in addition, implement various other engines and modules described in this disclosure. Computing system 810 broadly represents any single or multi-processor computing device or system capable of executing computer-readable instructions. Examples of computing system 810 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 810 may include at least one processor 814 and a system memory 816. By executing the software that implements image-assisted search system 208, computing system 810 becomes a special purpose computing device that is configured to perform contextual, image-assisted generation of search term information in manners described elsewhere in this disclosure.

Processor 814 generally represents any type or form of processing unit capable of processing data or interpreting and executing instructions. In certain embodiments, processor 814 may receive instructions from a software application or module. These instructions may cause processor 814 to perform the functions of one or more of the embodiments described and/or illustrated herein. System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. The ROM or flash memory can contain, among other code, the Basic Input-Output System (BIOS) which controls basic hardware operation such as the interaction with peripheral components. Although not required, in certain embodiments computing system 810 may include both a volatile memory unit (such as, for example, system memory 816) and a non-volatile storage device (such as, for example, primary storage device 832, as described further below). In one example, program instructions executable to implement a forwarding engine configured to forward messages using bit indexed explicit replication (BIER) may be loaded into system memory 816.

In certain embodiments, computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller 818 may perform and/or be a means for performing, either alone or in combination with other elements, one or more of the operations or features described and/or illustrated herein. I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer) for display on display device 824. Computing system 810 may also include at least one input device 828 coupled to communication infrastructure 812 via an input interface 830. Input device 828 generally represents any type or form of input device capable of providing input, either computer or human generated, to computing system 810. Examples of input device 828 include, without limitation, a keyboard, a pointing device, a speech recognition device, or any other input device.

As illustrated in FIG. 8, computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may include a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810. A storage device like primary storage device 832 can store information such as routing tables and forwarding tables.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may be a part of computing system 810 or may in some embodiments be separate devices accessed through other interface systems. Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8.

Computing system 810 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 810 for storage in memory via a network such as the Internet or upon a carrier medium. The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the embodiments described and/or illustrated herein. Additionally or alternatively, one or more of the embodiments described and/or illustrated herein may be implemented in firmware and/or hardware. For example, computing system 810 may be configured as an application specific integrated circuit (ASIC) adapted to implement one or more of the embodiments disclosed herein.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, comprising:
   receiving, at a computer implemented system for searching a knowledge base of products, an image of an object submitted by a user of the computer implemented system;

obtaining a classification label corresponding to the object in the image, wherein the classification label corresponds to an object classification that is associated with multiple contexts of the object, wherein the multiple contexts include one or more of a system in which the object may be used, and an accessory that may be used with the object;

checking a context module database to determine whether there is a follow-up question associated with the classification label, wherein the follow-up question relates to the multiple contexts associated with the classification label;

in response to determining there is a follow-up question associated with the classification label, presenting the follow-up question to the user and receiving an answer to the follow-up question from the user;

selecting, based on the answer from the user, a knowledge base field that identifies a context from the multiple contexts associated with the object classification, the knowledge base field corresponding to a field name in the knowledge base of products to be searched; and generating search term information for searching of the knowledge base of products, wherein the search term information is generated based, at least in part, on the classification label and the selected knowledge base field such that the classification label is used as a search term to search in the field name in the knowledge base of products, the field name corresponding to the selected knowledge base field.

2. The method of claim 1, further comprising:
repeatedly checking the context module database for additional follow-up questions associated with answers provided by the user in response to one or more prior additional follow-up questions;
presenting the additional follow-up questions to the user;
receiving answers to the additional follow-up questions from the user;
selecting, for each answer to each additional follow-up question, a knowledge base field that identifies a context for the answer; and
once no further additional follow-up question is found in the context module database, generating the search term information based, at least in part, on the answers received from the user to the additional follow-up questions and the selected knowledge base fields identifying the contexts for the answers.

3. The method of claim 2, further comprising
generating a search query from the search term information.

4. The method of claim 1, further comprising:
generating a search query from the search term information.

5. The method of claim 1, wherein:
the knowledge base comprises multiple knowledge base fields; and
the search term information comprises an association between the classification label and the selected knowledge base field.

6. The method of claim 4, further comprising:
using the search query to search the knowledge base; and
presenting results of the search query to the user.

7. An information handling system comprising:
one or more processors;
a non-transitory computer-readable storage medium coupled to the one or more processors; and a plurality of instructions, encoded in the computer-readable storage medium and configured to cause the one or more processors to
receive an image of an object submitted by a user of the information handling system,
obtain a classification label corresponding to the object in the image, wherein the classification label corresponds to an object classification that is associated with multiple contexts of the object, wherein the multiple contexts include one or more of a system in which the object may be used, and an accessory that may be used with the object;
check a context module database to determine whether there is a follow-up question associated with the classification label, wherein the follow-up question relates to the multiple contexts associated with the classification label;
in response to determining there is a follow-up question associated with the classification label, present the follow-up question to the user and receive an answer to the follow-up question from the user;
select, based on the answer from the user, a knowledge base field that identifies a context from the multiple contexts associated with the object classification, the knowledge base field corresponding to a field name in a knowledge base of products to be searched; and
generate search term information for searching of the knowledge base of products, wherein the search term information is generated based, at least in part, on the classification label and the selected knowledge base field such that the classification label is used as a search term to search in the field name in the knowledge base of products, the field name corresponding to the selected knowledge base field.

8. The information handling system of claim 7, wherein the plurality of instructions is further configured to cause the one or more processors to:
repeatedly check the context module database for additional follow-up questions associated with answers provided by the user in response to one or more prior additional follow-up questions;
present the additional follow-up questions to the user;
receive answers to the additional follow-up questions from the user;
select, for each answer to each additional follow-up question, a knowledge base field that identifies a context for the answer; and
once no further additional follow-up question is found in the context module database, generate the search term information based, at least in part, on the answers to the additional follow-up questions and the selected knowledge base fields identifying the contexts for the answers.

9. The information handling system of claim 8, wherein the plurality of instructions is further configured to cause the one or more processors to generate a search query from the search term information.

10. The information handling system of claim 7, wherein the plurality of instructions is further configured to cause the one or more processors to generate a search query from the search term information.

11. The information handling system of claim 7, wherein:
the knowledge base comprises multiple knowledge base fields; and
the search term information comprises an association between the classification label and the selected knowledge base field.

12. A non-transitory computer readable storage medium having program instructions encoded therein, wherein the program instructions are executable to:
   receive, at a computer implemented system for searching a knowledge base of products, an image of an object submitted by a user of the computer implemented system;
   obtain a classification label corresponding to the object in the image, wherein the classification label corresponds to an object classification that is associated with multiple contexts of the object, wherein the multiple contexts include one or more of a system in which the object may be used, and an accessory that may be used with the object;
   check a context module database to determine whether there is a follow-up question associated with the classification label, wherein the follow-up question relates to the multiple contexts associated with the classification label;
   in response to determining there is a follow-up question associated with the classification label, presenting the follow-up question to the user and receiving an answer to the follow-up question from the user;
   select, based on the answer from the user, a knowledge base field that identifies a context from the multiple contexts associated with the object classification, the knowledge base field corresponding to a field name in the knowledge base of products to be searched; and
   generate search term information for searching of the knowledge base of products, wherein the search term information is generated based, at least in part on, the classification label and the selected knowledge base field such that the classification label is used as a search term to search in the field name in the knowledge base of products, the field name corresponding to the selected knowledge base field.

13. The non-transitory computer readable storage medium of claim 12, wherein the program instructions are further executable to:
   repeatedly check the context module database for additional follow-up questions associated with answers provided by the user in response to one or more prior additional follow-up questions;
   present the additional follow-up questions to the user;
   receive answers to the additional follow-up questions from the user;
   select, for each answer to each additional follow-up question, a knowledge base field that identifies a context for the answer; and
   once no further additional follow-up question is found in the context module database, generate the search term information based, at least in part, on the answers received from the user to the additional follow-up questions and the selected knowledge base fields identifying the contexts for the answers.

14. The non-transitory computer readable storage medium of claim 13, wherein the program instructions are further executable to generate a search query from the search term information.

15. The non-transitory computer readable storage medium of claim 12, wherein the program instructions are further executable to generate a search query from the search term information.

16. The non-transitory computer readable storage medium of claim 12, wherein:
   the knowledge base comprises multiple knowledge base fields; and
   the search term information comprises an association between the classification label and the selected knowledge base field.

17. The non-transitory computer readable storage medium of claim 15, wherein the program instructions are further executable to
   use the search query to search the knowledge base; and
   present results the search query to the user.

* * * * *